United States Patent [19]

Hopper et al.

[11] Patent Number: 5,777,014

[45] Date of Patent: Jul. 7, 1998

[54] PVC SHEET MATERIAL HAVING IMPROVED WATER-BASED COATING RECEPTIVITY

[75] Inventors: Steven P. Hopper, Glen Ellyn; Kimberly L. Stefanisin, Oak Lawn; Ronald D. Svoboda, Hickory Hills, all of Ill.

[73] Assignee: The C.P. Hall Company, Chicago, Ill.

[21] Appl. No.: 753,925

[22] Filed: Dec. 3, 1996

[51] Int. Cl.⁶ .................................................. C08J 5/10
[52] U.S. Cl. .................. 524/308; 524/306; 524/317; 524/430; 524/431; 524/432; 524/433
[58] Field of Search .................... 524/308, 306, 524/317, 430, 431, 432, 433

[56] References Cited

U.S. PATENT DOCUMENTS

| | | | |
|---|---|---|---|
| 2,956,976 | 10/1960 | Peciura | 260/30.6 |
| 3,969,313 | 7/1976 | Aishima et al. | 260/40 R |
| 4,058,471 | 11/1977 | Glatti et al. | 252/63.5 |
| 4,132,691 | 1/1979 | Ejk | 260/23 XA |
| 4,594,372 | 6/1986 | Natov et al. | 523/208 |
| 4,966,936 | 10/1990 | Tomaschek et al. | 524/425 |
| 5,021,482 | 6/1991 | Wozniak | 524/100 |
| 5,310,805 | 5/1994 | Igarashi et al. | 525/239 |

*Primary Examiner*—Peter D. Mulcahy
*Attorney, Agent, or Firm*—Marshall, O'Toole, Gerstein, Murray & Borun

[57] ABSTRACT

A plasticized polyvinyl chloride (PVC) resin composition and method of plasticizing and decreasing the hydrophobicity of said PVC resin for adherence of aqueous coating compositions, such as water-based inks, by incorporating into the PVC resin a polymeric plasticizer for PVC, a monomeric diacid plasticizer, comprising primarily a $C_5$, $C_4$ or $C_3$ diacid plasticizer, or mixtures, in a ratio of polymeric/monomeric plasticizers of 5/95 to 95/5, preferably 90/10 to 60/40, and at least about 0.1%, based on the weight of the PVC resin, of a metal salt additive, wherein the metal salt is an oxide or a hydroxide and has an oxidation state of plus two, three or four, preferably calcium oxide and/or calcium hydroxide. The monomeric/polymeric plasticizer combination together with the metal salt additive(s) unexpectedly decreases the hydrophobicity of the PVC surface for strong adherence of water-based inks and coatings thereto.

28 Claims, No Drawings

PVC SHEET MATERIAL HAVING IMPROVED WATER-BASED COATING RECEPTIVITY

FIELD OF THE INVENTION

The present invention is directed to a PVC resin-based composition and methods for manufacturing and using the composition in the form of a flexible sheet or film having improved receptivity toward water-based coatings, particularly water-based inks. More particularly, the present invention is directed to a PVC resin-based composition and methods of manufacturing PVC-based flexible sheets or films that are more hydrophilic and have improved adherence to water-based inks and other water-based coatings having unexpectedly improved PVC adherence.

BACKGROUND OF THE INVENTION

Polyvinyl chloride (PVC) resin is a polymer that has many uses. For example, flexible PVC is used as a substrate that is coated with a printed message or design and used as, for example, a PVC-faced wall covering; PVC-impregnated or laminated fabrics; sheets used as banners or decals; or sheet materials printed with identifying marks of the manufacturer, lot of the material, and the like. For many years, the inks and coatings applied to PVC have been traditional solvent-based compositions. In response to the broad-spread market trend of lowering the amount of solvents used in inks and coatings, and thus conforming to ever increasing regulatory demands for lower volatile organic compound (VOC) systems, ink and coating manufacturers have created higher solids solvent-based systems and water-based systems.

The flexible PVC manufacturer has been faced with the need to make this intrinsically hydrophobic material more hydrophilic so as to accommodate its printing and/or coating with low solvent or water-based ink and coating materials. Typical flexible PVC is plasticized with various monomeric and/or polymeric esters and may or may not contain other additives, such as fillers, pigments and stabilizers. A typical measure of hydrophobicity in PVC films and sheets is a surface energy measurement, in dynes/cm, in the low to middle thirties. Flexible PVC with these hydrophobic surfaces are not particularly receptive to low solvent inks and coatings, and especially water-based inks and coating compositions. Modifications upwards of surface tension measurements in dynes/cm would be highly desirable and would be expected to increase the receptivity of flexible PVC sheets and films to water-based inks and coatings. The composition of the present invention, having a plasticizer combination including a primary polymeric plasticizer and a combination of plasticizer additives, including a particular class of monomeric plasticizers, and a calcium or magnesium metal oxide or metal hydroxide, unexpectedly and substantially increases the hydrophilicity flexible PVC resin sheet materials for strong adherence of aqueous coatings.

It is known that flexible PVC should include one or more primary monomeric or polymeric plasticizers, e.g., phthalates, trimellitates, or adipates, in an amount of about 20 to 100 parts for every 100 parts PVC resin. PVC that requires more permanent (longer term) plasticization includes a polymeric plasticizer; and PVC that functions when plasticized for a shorter term, includes a monomeric plasticizer. It is also known that oxides or hydroxides of aluminum, zinc, and alkaline earth metals, e.g., calcium or magnesium oxides or hydroxides, improve the processing, heat stability, and/or electrical insulation properties of PVC resins. Examples of prior art U.S. patents that teach the addition of plasticizers and/or alkaline earth metal compounds, e.g., oxides, hydroxides, or carbonates for various purposes, that are unrelated to improvements in water-receptivity, include the following: Glatti et al. U.S. Pat. No. 4,058,471; Igarashi et al. U.S. Pat. No. 5,310,805; Ejk U.S. Pat. No. 4,132,691; Peciura U.S. Pat. No. 2,956,976; Tomaschek et al. U.S. Pat. No. 4,966,936; Aishima et al. U. S. Pat. No. 3,969,313; Natov et al. U.S. Pat. No. 4,594,372; and Wozniak U. S. Pat. No. 5,021,482.

In accordance with the present invention, it has been found that a combination of a polymeric plasticizer and a diacid monomeric plasticizer that primarily comprises a $C_5$ or less diacid ($C_5$, $C_4$, $C_3$ or mixtures in a weight percentage greater than 50%) in a ratio of polymeric plasticizer to monomeric plasticizer in the range of about 95/5 to 5/95, preferably about 90/10 to about 60/40, together with a metal oxide or metal hydroxide additive having a plus two, plus three, or plus four oxidation state, preferably a calcium oxide or calcium hydroxide, or mixtures thereof, in an amount of at least about 0.1%, based on the weight of PVC resin, preferably at least about 0.3%, unexpectedly decreases the hydrophobicity of PVC sheets or films so that water-based coatings are firmly adhered to the PVC sheet surface.

SUMMARY OF THE INVENTION

In brief, the present invention is directed to a plasticized polyvinyl chloride (PVC) resin composition and method of plasticizing PVC resin by incorporating into the PVC resin a polymeric plasticizer for PVC; a monomeric plasticizer that is predominantly a $C_5$ or less diacid monomeric plasticizer (contained in the monomeric plasticizer composition in an amount greater than any other monomeric plasticizer contained therein) in a ratio of monomeric plasticizer/polymeric plasticizer of about 95/5 to about 5/95, preferably 10/90 to 40/60; and a metal oxide plasticizer additive in the amount of at least about 0.1%, preferably at least about 0.3%, more preferably at least about 0.5%, based on the weight of the PVC resin, wherein the metal has an oxidation state of plus two, plus three or plus four, preferably calcium oxide and/or calcium hydroxide. More preferably, the PVC plasticizers are present in a ratio of monomeric plasticizer/polymeric plasticizer of about 20/80 to about 30/70 and the metal oxide additive is calcium oxide. The monomeric plasticizer (primarily $C_5$ or less diacid)/polymeric plasticizer combination together with the metal oxide additive(s) unexpectedly decreases the hydrophobicity of the PVC surface for strong adherence of water-based inks and coatings thereto.

The monomeric primarily $C_5$ or less diacid plasticizer/polymeric plasticizer combination is included with the PVC resin in a plasticizing-effective amount, e.g., about 20 to about 100 parts, based on 100 parts of the PVC resin. The metal oxide additive is included with the PVC resin in an amount of at least about 0.1%, based on the weight of the PVC resin, most preferably in an amount of at least about 0.5% metal oxide additive. Best results are achieved at a metal oxide loading in an amount in the range of about 1% to about 3% by weight metal oxide additive, based on the weight of the PVC resin.

DETAILED DESCRIPTION OF THE PREFERRED EMBODIMENTS

In accordance with the present invention, it has been found that flexible PVC sheet or film materials can be rendered surprisingly more hydrophilic by incorporating therein a combination of monomeric and polymeric plasticizers and a metal oxide or metal hydroxide additive, wherein the metal has an oxidation state of plus two, plus three or plus four. In one embodiment, the metal oxide is selected from the group consisting of magnesium oxide, calcium oxide, magnesium hydroxide, calcium hydroxide, and mixtures thereof, preferably calcium oxide. The hydrophilic, flexible PVC sheet material can be coated with water-based compositions, such as aqueous printing inks, thereby eliminating organic solvents in the inks and other coatings to satisfy environmental regulations, while achieving strong adherence of the dried coating composition on the coated surface(s) of the PVC sheet or film material.

The monomeric plasticizers useful, together with the polymeric plasticizer and metal oxide or metal hydroxide, to decrease the hydrophobicity (increase the hydrophilicity) of the PVC sheet material surface comprises a monomeric primarily $C_5$ or less diacid plasticizer, (e.g., PLASTHALL® 7050 plasticizer of The C. P. Hall Company). The monomeric primarily $C_5$ or less diacid plasticizers have a structural formula I, as follows:

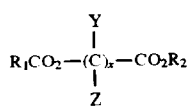

wherein x=1–3; and when x=1, Y and Z (same or different)=H or $CH_3$ when x=2, Y=H and Z=H or $CH_3$ when x=3, both Y and Z=H, and wherein $R_1$ and $R_2$ (same or different)=H, an alkyl group having about 8 to about 18 carbon atoms, or a $C_8$-$C_{18}$ alkyl ether group. Particularly useful compounds, include structures IA–IL, inclusive:

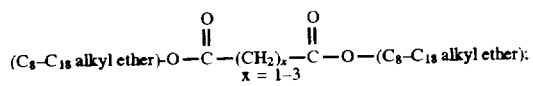

IA

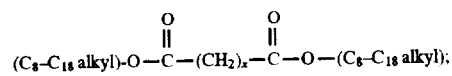

IB

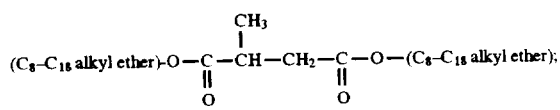

IC

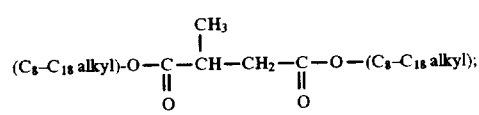

ID

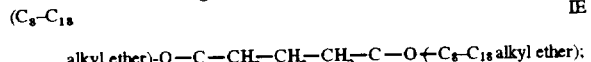

IE

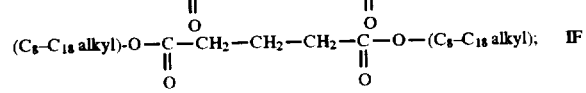

IF

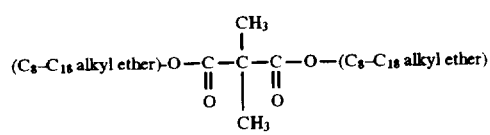

IG

-continued

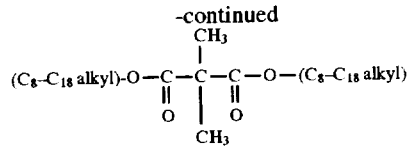

IH

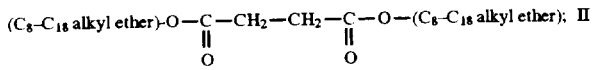

II

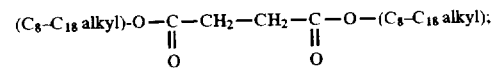

IJ

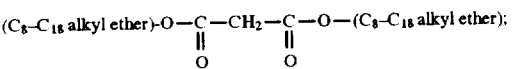

IK and

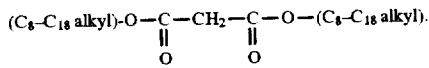

IL

It is known that the preparation of the above structures leads primarily to the diesters, as shown structurally above, together with small amounts, i.e., 2–5% by weight, of half esters. The data shown in the examples was obtained from the diesters shown structurally above that, due to the typical esterification method, may have included about 2–5% half esters of the above structures.

The primarily $C_5$ or less diacid monomeric plasticizers can be used as 100% primarily $C_5$ or less diacid, or may be mixed with other plasticizers (monomeric and/or polymeric) so long as the primarily $C_5$ or less diacid monomeric plasticizer is included in the PVC resin in a weight ratio of primarily $C_5$ or less diacid monomeric plasticizer/polymeric plasticizer of about 95/5 to about 5/95, preferably about 10/90 to about 40/60. It should be understood that monomeric plasticizers other than the primarily $C_5$ or less diacids disclosed herein may be added to the PVC resin together with the primarily $C_5$ or less diacid monomeric plasticizers, so long as the ratio of primarily $C_5$ or less diacid monomeric plasticizer/polymeric plasticizer is within the prescribed range. For example, a blend of $C_5$ diacid monomeric plasticizer and $C_4$ diacid monomeric plasticizer or the use of a $C_4$ diacid monomeric plasticizer modified with the appropriate alkyl ether alone (see Table 2, Experiment 13) within the range of ratios of 90:10 to 50:50, preferably in the range of 80:20 to 60:40, $C_5$:$C_4$ appears to be equally effective when compared to using the $C_5$ diacid as the sole monomeric plasticizer.

The monomeric plasticizers are useful, with the metal oxide or metal hydroxide having an oxidation state of +2 +3, or +4, together with any polymeric plasticizer useful a a plasticizer for PVC, for example, a polyester sebacate, polyester adipate or a polyester phthalate plasticizer. Th preferred monomeric primarily $C_5$ or less diacid is a di-lon chain ($R_1$ and $R_2$ each are a $C_8$-$C_{18}$ alkyl, preferably $C_{10}$-$C_5$ alkyl,) ether diacid $C_5$ monomeric plasticize (formula IB) used together with a polyester adipate poly meric plasticizer, formed as a polymerized reaction produc of adipic acid and 1,3 butane diol terminated with a lon chain ($C_8$ to $C_{18}$) fatty acid or fatty alcohol, said polyeste adipate having a weight average molecular weight in th range of about 1,000 to about 5,000, preferably about 1,80 to 3,500 (e.g., PARAPLEX® G-54 plasticizer of The C. Hall Company). It should be understood that the fatt $C_8$-$C_{18}$ alkyl radicals that form the esters and alkyl eth esters of formulae IA–IL may be blends of different lor chain ($C_6$-$C_{24}$) alkyl groups, but are predominantly (mo than 50% by weight) $C_8$-$C_{18}$ alkyl radicals, and preferab 100% by weight $C_8$-$C_{18}$ alkyl radicals, or may be formed from more than 50% by weight $C_8$, $C_{10}$, $C_{12}$, $C_{14}$, $C_{16}$ and/or $C_{18}$ alkyl radicals alone or in admixture.

Any polymeric plasticizer particularly suitable for plasticizing PVC resin can be used as the polymeric plasticizer. Other suitable polymeric plasticizers that are useful in accordance with the principles of the present invention preferably include materials in the molecular weight range of about 800 to about 8,000. The wide variety of polymeric plasticizers that are suitable for plasticizing PVC include reaction products of common diacids from the range of $C_4$ to $C_{12}$ with glycols from the range of $C_2$ to $C_{10}$ terminated with monofunctional acids or alcohols in the range of $C_6$ to $C_{20}$. The sole use of common monomeric plasticizers across the broad range of materials yields PVC that is more hydrophobic, having typical surface tension values of 30–34 dynes/cm. Of the monomeric plasticizers evaluated, only butyl benzyl phthalate gave a reading in excess of 34 dynes/cm, namely 36 dynes/cm. By contrast, the base readings for PVC plasticized by polymeric plasticizers are, in general, higher than 34 dynes/cm. Since the purpose of this invention is to decrease the hydrophobicity of PVC to the maximum extent, polymeric plasticizers are preferred over monomeric plasticizers. However, the effect of calcium oxide in conjunction with the primarily $C_5$ or less diacid monomeric plasticizers alone is evidenced by a 1 and 0 unit increase for dioctyl phthalate and SANTICIZER® 160 (S-160) monomeric PVC plasticizers, respectively.

TABLE 1

| | | | | |
|---|---|---|---|---|
| Geon ® 30 | 100.0 | 100.0 | 100.0 | 100.0 |
| Synpron 0350 | 1.0 | 1.0 | 1.0 | 1.0 |
| PARAPLEX ® G-62 | 5.0 | 5.0 | 5.0 | 5.0 |
| G-54 80/7050 20/CaO 0.1 | 67.0 | — | — | — |
| G-54 80/7050 20/CaO 0.3 | — | 67.0 | — | — |
| G-54 80/7050 20/CaO 0.5 | — | — | 67.0 | — |
| PARAPLEX ® G-54 | — | — | — | 67.0 |
| TOTAL | 173.0 | 173.00 | 173.00 | 173.00 |
| Variable | G-54 80/7050 20 CaO 0.1 | G-54 80/7050 20 CaO 0.3 | G-54 80/7050 20 CaO 0.5 | G-54 |
| Surface Tension dynes/cm | 37 | 41 | 43 | 38 |

The data in Tables 1 and 2 show the effect of various monomeric plasticizers (Variable), combined with a primary polymeric plasticizer (polyester adipate) and calcium oxide, on the hydrophobicity of PVC sheets or films. Major classes of monomeric plasticizer additives are exemplified as follows: ether esters of two diacids, such as dibutyl ethoxy ethyl adipate (DBEEA), dibutyl ethoxy adipate (DBEA) dibutyl ethoxy sebacate (DBES), dialkyl ($C_6$ to $C_{12}$ and mixtures) ether $C_5$ monomeric plasticizers such as PLAST-HALL® 7050 ester plasticizer of The C. P. Hall Company containing predominantly (more than 50% based on the total weight of monomeric plasticizers added to the PVC resin) a primarily $C_5$ or less diacid having long chain alkyl ($C_8$-$C_{18}$) end groups; a similar di-long chain ester which is a $C_6$ (adipate) diester having two long chain ($C_8$-$C_{18}$) end groups (Example 12); trimellitates, such as trioctyl trimellitate (TOTM); di-long chain ($C_6$ to $C_{12}$) adipates, such as dioctyl adipate (DOA); azelates such as dioctyl azelate (DOZ); linear phthalates, such as those formed as a reaction product of a fatty ($C_6$ to $C_{12}$) alcohol or mixture of fatty alcohols reacted with phthalic anhydride, e.g., 6-10 P plasticizer of The C. P. Hall Company, formed from a mixture of hexyl, octyl and decyl alcohols reacted with phthalic anhydride; branched long chain ($C_6$ to $C_{12}$) phthalates, particularly the branched di-long chain ($C_6$ to $C_{12}$) phthalates, such as dioctyl phthalate (DOP); and branched long chain ($C_6$ to $C_{12}$) phosphates, such as KRONITEX® 100 (K-100) (more recently, REAFOS®), which is a mixed long chain ($C_4$ to $C_{12}$) alkylaryl phosphate. Additionally, a monomeric $C_6$ diacid plasticizer is compared to the monomeric primarily $C_5$ or less diacid plasticizer with both plasticizers having the di-long chain ($C_8$-$C_{18}$) alkyl ether end groups.

All of these materials yield a PVC surface tension of 37±1 dynes/cm, except for the monomeric long chain primarily $C_5$ or less diacid monomeric plasticizers, such as PLAST-HALL® 7050 plasticizer, that provide PVC with a surface tension value of $40^+$ dynes/cm when combined with a polymeric PVC plasticizer and a metal oxide or hydroxide, such as calcium oxide. The difference between 37 and 40 dynes/cm is outside the range of experimental error and represents a significant and unexpected improvement in increasing the hydrophilic nature of a PVC film or sheet material.

One series of materials exemplifying a class of diacids having the general formula (IM):

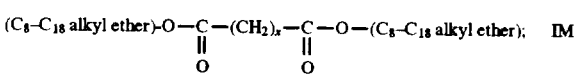

, wherein x=2, 3, 4 led to the following results when examined in the preferred embodiment of the invention. When x=4 ($C_6$ diacid) the surface tension was 36 dynes/cm. When x=2 or x=3 ($C_4$ and $C_5$ diacids and mixtures), the measured surface tension was 40–42. These results established the nomenclature used throughout this disclosure in referring to a "primarily $C_5$ or less" diacid plasticizer (see Table 2, Experiment 13 in comparison to Experiments 12 and 10 as well as Table 6, Experiments 45–47).

TABLE 2

| EXAMPLE | 1 | 2 | 3 | 4 | 5 | 6 | 7 | 8 | 9 | 10 | 11 | 12 | 13 |
|---|---|---|---|---|---|---|---|---|---|---|---|---|---|
| Geon ® 30 (PVC resin) | 100.0 | 100.0 | 100.0 | 100.0 | 100.0 | 100.0 | 100.0 | 100.0 | 100.0 | 100.0 | 100.0 | 100.0 | 100.0 |
| Synpron 0350 (barium/cadmium PVC stabilizer) | 1.0 | 1.0 | 1.0 | 1.0 | 1.0 | 1.0 | 1.0 | 1.0 | 1.0 | 1.0 | 1.0 | 1.0 | 1.0 |
| PARAPLEX ® G-62 (epoxidized soy bean oil) | 5.0 | 5.0 | 5.0 | 5.0 | 5.0 | 5.0 | 5.0 | 5.0 | 5.0 | 5.0 | 5.0 | 5.0 | 5.0 |
| *PLASTHALL ® 226 (DBEEA) | 67.0 | — | — | — | — | — | — | — | — | — | — | — | — |

TABLE 2-continued

| EXAMPLE | 1 | 2 | 3 | 4 | 5 | 6 | 7 | 8 | 9 | 10 | 11 | 12 | 13 |
|---|---|---|---|---|---|---|---|---|---|---|---|---|---|
| (dibutyl ethoxy ethyl adipate) | | | | | | | | | | | | | |
| *PLASTHALL ® 203 (DBEA) (dibutyl ethoxy adipate) | — | 67.0 | — | — | — | — | — | — | — | — | — | — | — |
| *PLASTHALL ® 207 (DBES) (dibutyl ethoxy sebacate) | — | — | 67.0 | — | — | — | — | — | — | — | — | — | — |
| *PLASTHALL ® TOTM (trioctyl trimellitate) | — | — | — | 67.0 | — | — | — | — | — | — | — | — | — |
| *PLASTHALL ® DOA (dioctyl adipate) | — | — | — | — | 67.0 | — | — | — | — | — | — | — | — |
| *PLASTHALL ® DOZ (dioctyl azealate) | — | — | — | — | — | 67.0 | — | — | — | — | — | — | — |
| *PLASTHALL ® 6-10P (linear octyl phthalate) | — | — | — | — | — | — | 67.0 | — | — | — | — | — | — |
| *KRONITEX ® 100 (K-100) | — | — | — | — | — | — | — | 67.0 | — | — | — | — | — |
| *PLASTHALL ® DOP | — | — | — | — | — | — | — | — | 67.0 | — | — | — | — |
| *PLASTHALL ® 7050 | — | — | — | — | — | — | — | — | — | 67.0 | — | — | — |
| *SANTICIZER ® 160 | — | — | — | — | — | — | — | — | — | — | 67.0 | — | — |
| *100% $C_6$ DIACID | — | — | — | — | — | — | — | — | — | — | — | 67.0 | — |
| *100% $C_4$ DIACID | — | — | — | — | — | — | — | — | — | — | — | — | 67.0 |
| TOTAL | 173.0 | 173.0 | 173.0 | 173.0 | 173.0 | 173.0 | 173.0 | 173.0 | 173.0 | 173.0 | 173.0 | 173.0 | 173.0 |
| Variable | DBEEA | DBEA | DBES | TOTM | DOA | DOZ | 6-10P | K-100 | DOP | 7050 | S-160 | $C_6$ Diacid | $C_4$ Diacid |
| Surface Tension dynes/cm | 36 | 37 | 36 | 36 | 36 | 37 | 36 | 36 | 38 | 40 | 37 | 36 | 42 |

*Plasticizer blend is (in parts by weight) polyester adipate PARAPLEX ® G-54 80/CaO-HP** 2/Variable 20

**High purity

The data of Table 3 show the effect of various polymeric plasticizers in combination with monomeric dialkyl diether glutarate plasticizers of formula ID, e.g., PLASTHALL® 7050, and high purity calcium oxide (CaO-HP). Polymeric glutarates (e.g., PLASTHALL® P-7035 and P-7046) appear to negatively affect the results while polymeric sebacates (PARAPLEX® G-25) and polymeric adipates, either high molecular weight (≈5,000) (PARAPLEX® G-41), or moderate molecular weight (≈3,000) (PARAPLEX® G-54) have positive effects. This table demonstrates that a polymeric plasticizer alone (e.g., neat PARAPLEX® G-54) without the monomeric primarily $C_5$ or less diacid plasticizer or the metal oxide or metal hydroxide is less preferable to plasticizer combinations containing a polymeric plasticizer, a primarily $C_5$ or less diacid monomeric plasticizer, and a metal oxide or metal hydroxide additive, wherein the metal has a plus two, plus three or plus four oxidation state, particularly calcium oxide. The plasticized PVC composition of the present invention, containing a monomeric dialkyl ether $C_5$ diacid plasticizer, together with a polymeric plasticizer and a calcium or magnesium oxide or hydroxide provides a surface tension of 39–40[+] dynes/cm in comparison to 32–37 dynes/cm for other plasticizer combinations.

TABLE 3

| EXAMPLE | 13 | 14 | 15 | 16 | 17 | 18 |
|---|---|---|---|---|---|---|
| Geon ® 30 (PVC resin) | 100.0 | 100.0 | 100.0 | 100.0 | 100.0 | 100.0 |
| Synpron 0350 (barium/cadmium PVC stabilizer) | 1.0 | 1.0 | 1.0 | 1.0 | 1.0 | 1.0 |
| PARAPLEX ® G-62 (epoxidized soy bean oil) | 5.0 | 5.0 | 5.0 | 5.0 | 5.0 | 5.0 |
| *PARAPLEX ® G-25 (polyester sebacate) | 67.0 | — | — | — | — | — |
| *PARAPLEX ® G-41 (polyester adipate) | — | 67.0 | — | — | — | — |
| *PLASTHALL ® P-7035 (polyester glutarate) | — | — | 67.0 | — | — | — |
| *PLASTHALL ® P-7046 (polyester glutarate) | — | — | — | 67.0 | — | — |
| *PARAPLEX ® G-54 (polyester adipate) | — | — | — | — | 67.0 | — |
| PARAPLEX ® G-54 (polyester | — | — | — | — | — | 67.0 |

TABLE 3-continued

| adipate) | | | | | | |
|---|---|---|---|---|---|---|
| TOTAL | 173.0 | 173.0 | 173.0 | 173.0 | 173.0 | 173.0 |
| Variable | G-25 | G-41 | P-7035 | P-7046 | G-54 | NEAT G-54 |
| Surface Tension dynes/cm | 39 | 39 | 32 | 34 | 40 | 37 |

*Dispersion of the polymeric plasticizer as the variable with the glutarate monomeric plasticizer and CaO, in parts by weight

| | |
|---|---|
| Variable | 78.4 |
| PLASTHALL® 7050 | 19.6 |
| Calcium Oxide HP** | 2.0 |

**High purity

Table 4 contains PVC hydrophobicity data for polymeric phthalate; polymeric adipate plasticizers, and mixed dibasic acids (G-30, G-31) without a monomeric plasticizer additive or a metal oxide additive; as well as an alkyl aryl phthalate plasticizer SANTICIZER® 160 (S-160). These plasticizer combinations yield poorer hydrophilicity results than other plasticizer combinations explored herein. The use of magnesium hydroxide alone or in combination with monomeric dialkyl ($C_8$-$C_{18}$) ether primarily $C_5$ or less diacid plasticizers, e.g., PLASTHALL® 7050, as well as the use of the monomeric dialkyl ether primarily $C_5$ or less diacid plasticizers alone, also yield less preferable hydrophilicity results when compared to the combination of a polymeric plasticizer, e.g., a polyester adipate, combined with a non-$C_5$ monomeric dialkyl ($C_8$-$C_{18}$) ether primarily $C_5$ or less diacid hydroxide; and mixtures of any two or more of said metal salts. The data of Table 4 show that the monomeric dialkyl ($C_8$-$C_{18}$) ether primarily $C_5$ or less diacid plasticizers and CaO, CaOH, MgO and/or MgOH can be added to the PVC resin together with a polymeric plasticizer commonly used as a PVC plasticizer, e.g., phthalates and adipates, to unexpectedly lower the hydrophobicity of PVC sheets and films so that the formulator need not change the plasticizer, e.g., a primary polymeric plasticizer that may be included with the PVC resin, as purchased from the PVC plasticizer supplier. Only the combination of the present invention (e.g., Examples 26 and 27) achieved surface tension measurements in the range of at least about 38 dynes/cm.

TABLE 4

| EXAMPLE | 19 | 20 | 21 | 22 | 23 | 24 | 25 | 26 | 27 |
|---|---|---|---|---|---|---|---|---|---|
| Geon ® 30 (PVC resin) | 100.0 | 100.0 | 100.0 | 100.0 | 100.0 | 100.0 | 100.0 | 100.0 | 100.0 |
| Synpron 0350 (barium/cadmium PVC stabilizer) | 1.0 | 1.0 | 1.0 | 1.0 | 1.0 | 1.0 | 1.0 | 1.0 | 1.0 |
| PARAPLEX ® G-62 (epoxidized soy bean oil) | 5.0 | 5.0 | 5.0 | 5.0 | 5.0 | 5.0 | 5.0 | 5.0 | 5.0 |
| SANTICIZER ® 160 (butyl benzyl phthalate) | 67.0 | — | — | — | — | — | — | — | — |
| RX-13290 (polyester adipate) | — | 67.0 | — | — | — | — | — | — | — |
| PARAPLEX ® G-30 (commercial mixed dibasic acid) | — | — | 67.0 | — | — | — | — | — | — |
| PARAPLEX ® G-31 (commercial mixed dibasic acid) | — | — | — | 67.0 | — | — | — | — | — |
| PARAPLEX ® G-54 (polyester adipate) | — | — | — | — | 67.0 | — | — | — | — |
| G-54 97/MgOH 3 | — | — | — | — | — | 67.0 | — | — | — |
| G-54 80/7050 20 | — | — | — | — | — | — | 67.0 | — | — |
| G-54 80/7050 20/MgOH 2 | — | — | — | — | — | — | — | 67.0 | — |
| G-54 80/7050 20/CaO-HP 2 | — | — | — | — | — | — | — | — | 67.0 |
| TOTAL Major Variable | 173.0 S-160 | 173.0 RX-13290 | 173.0 G-30 | 173.0 G-31 | 173.0 G-54 | 173.0 G-54 MgOH | 173.0 G-54 7050 | 173.0 G-54 7050 MgOH | 173.0 G-54 7050 CaO-HP |
| Surface Tension ASTM D-2578 dynes/cm | 36 | 33 | 34 | 34 | 36 | 36 | 35 | 38 | 40 |

7050 = dialkyl diether glutarate monomeric plasticizer plasticizer and a calcium and/or magnesium inorganic salt additive selected from the group consisting of calcium oxide; calcium hydroxide; magnesium oxide; magnesium Table 5 contains data on PVC plasticized with a combination of monomeric dialkyl ($C_8$-$C_{18}$) ether primarily $C_5$ or less diacid plasticizers and a polymeric adipate primary plasticizer and various oxides. Metal oxidation states of plus two, three or four are exemplified. Groups IIA and IIB of the periodic table are represented. Two forms of calcium oxide, as well as calcium and magnesium hydroxides, were tested. The data clearly shows that calcium oxide and calcium hydroxide are the preferred cation metal oxides (Examples 30, 31 and 32); followed by magnesium hydroxide (Example 28); ferric oxide (Example 33); titanium dioxide (Example 35); zinc oxide (Example 36); and then magnesium oxide (Example 29). The addition of any of the metal oxides having an oxidation state of plus two, three, or four decreased the hydrophobicity in comparison to the combination of a monomeric dialkyl ($C_8$-$C_{18}$) ether primarily $C_5$ or less diacid plasticizer and a polymeric adipate plasticizer without the metal oxide (Example 37). Calcium hydroxide is less preferred than calcium oxide, but also functions to unexpectedly reduce hydrophobicity of PVC sheets and films in accordance with the principles of the present invention. As seen in Table V, the plus two, three or four oxidation state metal oxides contribute positively to reducing the hydrophobicity of PVC, as exemplified by the control G-54 (80%)/7050 (20%) having no metal oxide or hydroxide salt and having a surface tension value in dynes/cm lower than the combination of a monomeric dialkyl ether ($C_8$-$C_{18}$) primarily $C_5$ or less diacid plasticizer and a polymeric plasticizer containing a metal oxide additive having a plus two, three or four oxidation state.

reproducibilities of the surface tension (dyne/cm) data. Examples 38 and 39, as well as 48 and 49, gave results of 34.5±0.5 dynes/cm and 37.5±0.5 dynes/cm, respectively. Examples 40 through 42 yielded values of 36±1 dynes/cm. Most importantly, Examples 44 through 47 yielded a range of results from 43 to 40 dynes/cm or 41.5±1.5 dynes/cm. Relative to other plasticizer combinations, with and without metal oxide or metal hydroxide salt additives, these combinations of Examples 44 through 47 demonstrate significant and unexpected improvement in reducing PVC hydrophobicity, as shown in the surface tension (dynes/cm) data.

TABLE 5

| EXAMPLE | 28 | 29 | 30 | 31 | 32 | 33 | 34 | 35 | 36 | 37 |
|---|---|---|---|---|---|---|---|---|---|---|
| Geon ® 30 (PVC resin) | 100.0 | 100.0 | 100.0 | 100.0 | 100.0 | 100.0 | 100.0 | 100.0 | 100.0 | 100.0 |
| Synpron 0350 (barium/cadmium PVC stabilizer) | 1.0 | 1.0 | 1.0 | 1.0 | 1.0 | 1.0 | 1.0 | 1.0 | 1.0 | 1.0 |
| PARAPLEX ® G-62 (epoxidized soy bean oil) | 5.0 | 5.0 | 5.0 | 5.0 | 5.0 | 5.0 | 5.0 | 5.0 | 5.0 | 5.0 |
| *MgOH | 67.0 | — | — | — | — | — | — | — | — | — |
| MgO | — | 67.0 | — | — | — | — | — | — | — | — |
| CaOH | — | — | 67.0 | — | — | — | — | — | — | — |
| CaO-HP | — | — | — | 67.0 | — | — | — | — | — | — |
| CaO-A | — | — | — | — | 67.0 | — | — | — | — | — |
| $Fe_2O_3$ | — | — | — | — | — | 67.0 | — | — | — | — |
| MnO | — | — | — | — | — | — | 67.0 | — | — | — |
| $TiO_2$ | — | — | — | — | — | — | — | 67.0 | — | — |
| ZnO | — | — | — | — | — | — | — | — | 67.0 | — |
| G-54 80/7050 20 | — | — | — | — | — | — | — | — | — | 67.0 |
| TOTAL | 173.0 | 173.0 | 173.0 | 173.0 | 173.0 | 173.0 | 173.0 | 173.0 | 173.0 | 173.0 |
| Variable | MgOH | MgO | CaOH | CaO-HP | CaO-A*** | $Fe_2O_3$ | MnO** | $TiO_2$ | ZnO | G-54 7050 |
| Surface Tension | | | | | | | | | | |
| ASTM D-2578 dynes/cm | 37 | 36 | 39 | 42 | 39 | 37 | ** | 37 | 37 | 35 |

*All oxides and hydroxides are blended with PARAPLEX ® G-54 plasticizer 80/PLASTHALL ® 7050 monomeric plasticizer 20 at 2 parts oxide per hundred parts total of plasticizer.
**MnO does not disperse in unfilled PVC recipe leaving voids in pressed sheets.
***CaO-A = technical grade CaO, 98% purity supplied by Aldrich Chemical.

Table 6 summarizes results from independent experiments utilizing identical compositions as a measure of the

TABLE 6

| EXAMPLE | 38 | 39 | 40 | 41 | 42 | 43 | 44 | 45 | 46 | 47 | 48 | 49 |
|---|---|---|---|---|---|---|---|---|---|---|---|---|
| Geon ® 30 | 100.0 | 100.0 | 100.0 | 100.0 | 100.0 | 100.0 | 100.0 | 100.0 | 100.0 | 100.0 | 100.0 | 100.0 |

TABLE 6-continued

| EXAMPLE | 38 | 39 | 40 | 41 | 42 | 43 | 44 | 45 | 46 | 47 | 48 | 49 |
|---|---|---|---|---|---|---|---|---|---|---|---|---|
| (PVC resin) Synpron 0350 (barium/cadmium PVC stabilizer) | 1.0 | 1.0 | 1.0 | 1.0 | 1.0 | 1.0 | 1.0 | 1.0 | 1.0 | 1.0 | 1.0 | 1.0 |
| PARAPLEX ® G-62 | 5.0 | 5.0 | 5.0 | 5.0 | 5.0 | 5.0 | 5.0 | 5.0 | 5.0 | 5.0 | 5.0 | 5.0 |
| PARAPLEX ® G-30 | 67.0 | 67.0 | — | — | — | — | — | — | — | — | — | — |
| PARAPLEX ® G-54 | — | — | 67.0 | 67.0 | 67.0 | 67.0 | — | — | — | — | — | — |
| G-54/7050/CaO-HP | — | — | — | — | — | — | 67.0 | 67.0 | 67.0 | 67.0 | — | — |
| G-54/7050/MgOH | — | — | — | — | — | — | — | — | — | — | 67.0 | 67.0 |
| TOTAL Variable | 173.0 G-30 | 173.0 G-30 | 173.0 G-54 | 173.0 G-54 | 173.0 G-54 | 173.0 G-54 | 173.0 G-54 7050 CaOH-HP | 173.0 G-54 7050 CaOH-HP | 173.0 G-54 7050 CaOH-HP | 173.0 G-54 7050 CaOH-HP | 173.0 G-54 7050 MgOH | 173.0 G-54 7050 MgOH |
| Surface Tension dynes/cm | 35 | 34 | 36 | 36 | 35 | 37 | 43 | 40 | 40 | 42 | 37 | 38 |

G-54 80
7050 20
CaO-HP/MgOH 2
G-30 = commercial mixed dibasic acid
G-54 = polyester adipate polymeric plasticizer
G-62 = epoxidized soy bean oil polymeric plasticizer
7050 = dialkyl diether glutarate monomeric plasticizer The Examples and data summarized in Table 7 are directed to various physical forms of monomeric dialkyl ($C_8$-$C_{18}$) ether primarily $C_5$ or less diacid plasticizers and polymeric plasticizer combinations and metal salt additives for reducing the hydrophobicity of PVC sheets and films. Plasticizer and salt additive combinations were prepared in a paste form (Example 50 calcium oxide paste) having 21 weight percent active CaO. dispersed in a combination of a polyester adipate plasticizer (G-54) and a dialkyl ($C_8$-$C_{18}$) ether primarily $C_5$ or less diacid monomeric plasticizer (PLASTHALL® 7050) liquid mixture at an 20/80 weight ratio of 7050 monomeric plasticizer/G-54 polymeric plasticizer, to provide 2.5 parts by weight active CaO. Example 50 provides an overall composition that is the same as Examples 51 through 53, with about 0.5% 7050 monomeric primarily $C_5$ or less diacid/G-54 polymeric plasticizer mixture provided in the calcium oxide paste. The calcium oxide level of 2.5 weight percent, based on the weight of PVC resin, from paste (Example 50) versus 2 or 3 parts by weight CaO from other physical forms of calcium oxide (Examples 51 and 52) yields a value of 39 dynes/cm. This compares to the values of 37 dynes/cm and 39 dynes/cm of Examples 51 and 52, and suggests that adding the oxide in a paste form gives comparable results to addition of the oxide from solid or liquid forms. Examples 51 through 53 show results at various levels of addition of calcium oxide added as a DRY LIQUID DISPERSION version (with 7050 monomeric primarily $C_5$ or less diacid/G-54 polymeric plasticizer mixture added) from 2 to 5 parts per hundred parts of PVC resin (pphr). The data supports the preferred use of 2 to 5 pphr as viable to obtain a surface tension of 38±1 dynes/cm utilizing a combination of calcium oxide with a polymeric adipate PVC plasticizer, e.g., G-54 and a monomeric primarily $C_5$ or less diacid dialkyl ($C_8$-$C_{18}$) ether monomeric plasticizer, e.g., PLASTHALL® 7050 plasticizer, at a weight ratio of 80/20, respectively. Increased hydrophilicity is seen at metal oxide loadings of at least about 0.1%, by weight of PVC resin, with more pronounced results at metal oxide loadings of at least about 0.5% by weight of PVC resin and 0.3% metal oxide. To achieve the full advantage of the present invention, the metal oxide should be included in composition in an amount of at least about 0.5% metal oxide based on the weight of PVC resin, with best results when the metal oxide is included in an amount of at least about 1%, based on the weight of PVC resin in the composition.

TABLE 7

| EXAMPLE | 50 | 51 | 52 | 53 | 54 |
|---|---|---|---|---|---|
| Geon ® (PVC resin) | 100.0 | 100.0 | 100.0 | 100.0 | 100.0 |
| Synpron 0350 (barium/cadmium PVC stabilizer) | 1.0 | 1.0 | 1.0 | 1.0 | 1.0 |
| PARAPLEX ® G-62 | 5.0 | 5.0 | 5.0 | 5.0 | 5.0 |
| CaO-HP | — | 2.22 | 3.33 | 5.55 | — |
| G-54 80/7050 20 | 64.5 | 65.0 | 65.0 | 65.0 | — |
| PAPAPLEX ® G-54 | — | — | — | — | 67.0 |
| CaO Paste Form 21% Active | 2.5 | — | — | — | — |
| TOTAL Variable | 173.0 Paste 2.5 | 173.22 DLD** 2.0 | 174.33 DLD** 3.0 | 176.55 DLD** 5.0 | 173.0 PARAPLEX ® G-54 |
| Surface Tension dynes/cm | 39 | 37 | 39 | 38 | 35 |

*DLD treated with 10% by weight PARAPLEX ® G-54 80/PLASTHALL ® 7050 20.
Paste treated with 21% by weight PARAPLEX ® G-54 80/PLASTHALL ® 7050 20.
**DLD = Dry liquid dispersion.

Examples 55 and 56 of Table 8 demonstrate improvements in surface tension data for adipate polymeric and monomeric primarily $C_5$ or less diacid dialkyl ($C_8$-$C_{18}$) ether plasticizer combinations and additive salts in comparison to a primary polymeric plasticizer alone, when using magnesium oxide or magnesium hydroxide. Similarly, Examples 57 and 58 demonstrate further improvements when the oxides or hydroxides are of calcium. Examples 59 through 61 show the following: (a) the incorporation of a monomeric primarily $C_5$ or less diacid dialkyl ($C_8$-$C_{18}$) ether plasticizer e.g., PLASTHALL® 7050, improves the polymeric plasticizer/calcium oxide composition, (b) a weight ratio of 20/80 of monomeric dialkyl ($C_8$-$C_{18}$) ether plasticizer/polymeric plasticizer is greatly preferred over a weight ratio of 5/95, and (c) increasing the weight ratio of monomeric primarily $C_5$ or less diacid dialkyl ($C_8$-$C_{18}$) ether plasticizer/polymeric plasticizer from 20/80 to 30/70 has no apparent effect in further reduction of PVC hydrophobicity.

It is clear from the Examples that the metal salt plays a significant role in reducing the hydrophobicity of PVC sheets or films—particularly by comparing Example 62 to Example 69 (Table 8) in conjunction with the results summarized in Table 5. Examples 64, 65 and 66 may be compared to Examples 62, 57, and 59, respectively. As also demonstrated in Tables 3 and 4, the use of PARAPLEX® G-54 is preferred. Examples 67 (Table 8), 18 (Table 3), 19 through 23 (Table 4), and 38 through 43 (Table 6) demonstrate the following: (a) primary polymeric plasticizers alone are insufficient, (b) the monomeric primarily $C_5$ or less diacid dialkyl ($C_8$-$C_{18}$) ether plasticizer, e.g., PLASTHALL® 7050/metal oxide additives offer a positive effect, and (c) when compared to the preferred embodiment of Examples 59 and 60 (Table 8), primary polymeric plasticizers alone are significantly less effective.

TABLE 8

| EXAMPLE | 55 | 56 | 57 | 58 | 59 | 60 | 61 |
|---|---|---|---|---|---|---|---|
| Geon ® 30 | 100.0 | 100.0 | 100.0 | 100.0 | 100.0 | 100.0 | 100.0 |
| Synpron 0350 | 1.0 | 1.0 | 1.0 | 1.0 | 1.0 | 1.0 | 1.0 |
| PARAPLEX ® G-62 | 5.0 | 5.0 | 5.0 | 5.0 | 5.0 | 5.0 | 5.0 |
| PARAPLEX ® G-54/MgOH | 67.0 | — | — | — | — | — | — |
| PARAPLEX ® G-54/MgO | — | 67.0 | — | — | — | — | — |
| PARAPLEX ® G-54/CaO | — | — | 67.0 | — | — | — | — |
| PARAPLEX ® G-54/CaOH | — | — | — | 67.0 | — | — | — |
| PARAPLEX ® G-54 80/ PLASTHALL ® 7050 20/CaO-HP 2 | — | — | — | — | 67.0 | — | — |
| PARAPLEX ® G-54 70/ PLASTHALL ® 7050 30/CaO-HP 2 | — | — | — | — | — | 67.0 | — |
| PARAPLEX ® G-54 95/ PLASTHALL ® 7050 5/CaO-HP 2 | — | — | — | — | — | — | 67.0 |
| PARAPLEX ® G-54 80/ PLASTHALL ® 7050 20 | — | — | — | — | — | — | — |
| PARAPLEX ® G-54 | — | — | — | — | — | — | — |
| PARAPLEX ® G-30 80/ PLASTHALL ® 7050 20 | — | — | — | — | — | — | — |
| PARAPLEX ® G-30/CaO-HP 2 | — | — | — | — | — | — | — |
| PARAPLEX ® G-30 80/ PLASTHALL ® 7050 20/CaO-HP 2 | — | — | — | — | — | — | — |
| PARAPLEX ® G-30 | — | — | — | — | — | — | — |
| TOTAL | 173.0 | 173.0 | 173.0 | 173.0 | 173.0 | 173.0 | 173.0 |
| Variable | G-54 MgOH | G-54 MgO | G-54 CaO-HP | G-54 CaOH | G-54 90 7050 20 CaO-HP 2 | G-54 70 7050 30 CaO-HP 2 | G-54 95 7050 5 CaO-HP 2 |
| Surface Tension dynes/cm | 38 | 36 | 40 | 39 | 43 | 43 | 38 |

| EXAMPLE | 62 | 63 | 64 | 65 | 66 | 67 |
|---|---|---|---|---|---|---|
| Geon ® 30 | 100.0 | 100.0 | 100.0 | 100.0 | 100.0 | 100.0 |
| Synpron 0350 | 1.0 | 1.0 | 1.0 | 1.0 | 1.0 | 1.0 |
| PARAPLEX ® G-62 | 5.0 | 5.0 | 5.0 | 5.0 | 5.0 | 5.0 |
| PARAPLEX ® G-54/MgOH | — | — | — | — | — | — |
| PARAPLEX ® G-54/MgO | — | — | — | — | — | — |
| PARAPLEX ® G-54/CaO | — | — | — | — | — | — |
| PARAPLEX ® G-54/CaOH | — | — | — | — | — | — |
| PARAPLEX ® G-54 80/ PLASTHALL ® 7050 20/CaO-HP 2 | — | — | — | — | — | — |

5,777,014

TABLE 8-continued

| | | | | | | |
|---|---|---|---|---|---|---|
| PARAPLEX ® G-54 70/<br>PLASTHALL ® 7050 30/CaO-HP 2 | — | — | — | — | — | — |
| PARAPLEX ® G-54 95/<br>PLASTHALL ® 7050 5/CaO-HP 2 | — | — | — | — | — | — |
| PARAPLEX ® G-54 80/<br>PLASTHALL ® 7050 20 | 67.0 | — | — | — | — | — |
| PARAPLEX ® G-54 | — | 67.0 | — | — | — | — |
| PARAPLEX ® G-30 80/<br>PLASTHALL ® 7050 20 | — | — | 67.0 | — | — | — |
| PARAPLEX ® G-30/CaO-HP 2 | — | — | — | 67.0 | — | — |
| PARAPLEX ® G-30 80/<br>PLASTHALL ® 7050 20/CaO-HP 2 | — | — | — | — | 67.0 | — |
| PARAPLEX ® G-30 | — | — | — | — | — | 67.0 |
| TOTAL | 173.0 | 173.0 | 173.0 | 173.0 | 173.0 | 173.0 |
| Variable | G-54 80<br>7050 20 | G-54 | G-30 60<br>7050 20 | G-30<br>CaO-HP | G-30 80<br>7050 20<br>CaO-HP 2 | G-30 |
| Surface Tension<br>dynes/cm | 35 | 36 | 37 | 40 | 40 | 35 |

VARIABLE PREPARATION

Liquid Plasticizer Blending Procedure

Liquid blends (dispersions) were mixed in a 600 ml beaker on a PMC 502 series hot plate using a 1.5-inch stirring bar at 93° C. (200° F.) for a minimum of 30 minutes total mixing time. All raw materials were weighed into the 600 ml beaker to the nearest 0.1 of a gram prior to mixing. The liquid dispersions were then cooled prior to use in compounds.

Dry Liquid Dispersion (Plasticizer on Carrier) Procedure

DLDs (plasticizer on a carrier) were made in a Model N-50 Hobart mixer, on low speed. The carrier (calcium oxide HP) was weighed into the mixing bowl and allowed to mix for one minute. Next, the plasticizer or plasticizer blend was added slowly within 3 minutes. At 7 minutes, the mixer was stopped, wire whip and bowl scraped, and all materials blended for an additional 3 minutes for a total mixing time of 10 minutes.

Paste Blending Procedure

Pastes were made in the Model N-50 Hobart Mixer. The powdered material was weighed into the mixing bowl and mixed for 1 minute on low speed. Next, the plasticizer or plasticizer blend was added slowly over 1 minute and allowed to mix for 4 minutes. After a total of 5 minutes the mixer was stopped, paddle and bowl scraped, and all materials were mixed for an additional 5 minutes.

Finally, the pastes were transferred into a 3-gallon porcelain jar and 10 half-inch porcelain grinding beads were added. The pastes were than mixed on a Model 764AV unitized jar mill for 24 hours.

Plasticized PVC Mixing Procedure

All raw materials for compounds were weighed into a 1000 ml beaker. The order of addition is as follows:
1. resin
2. stabilizer
3. plasticizer dispersion and/or plasticizer.

The preweighed raw materials were hand mixed prior to fluxing on a steam preheated, 2-roll, 6 by 12-inch Farrell Lab Mill. Compounds were fluxed for ~15 minutes at 182° C. (360° F.), then sheeted off the mill prior to molding. Press conditions: temperature—182° C. (360° .F), time—10 minutes, pressure on the sheet surface—833 psi for sheets 0.075±0.002 inches thick, and 1319 psi for sheets 0.020±0.002 inches thick.

Fused sheets were allowed to condition for 40 hours at 23° C. and a 55% relative humidity prior to testing. Performance properties were run in accordance to ASTM D2578, ASTM D638-84 (type IV die) and ASTM D2240-84 (15 second reading).

What is claimed is:

1. A plasticized polyvinyl chloride resin composition comprising polyvinyl chloride resin; a polymeric polyester plasticizer for said polyvinyl chloride resin; a monomeric $C_5$ or less diacid ester plasticizer in a weight ratio of monomeric plasticizer to polymeric plasticizer of 95/5 to 5/95, said plasticizers included in a total amount of about 20% to about 100% by weight, based on the weight of polyvinyl chloride resin; and a metal salt additive selected from metal oxides and metal hydroxides, wherein the metal has an oxidation state selected from the group consisting of plus two, plus three, and plus four, said metal salt included in the composition in an amount of at least about 0.1%, based on the weight of polyvinyl chloride resin.

2. The composition of claim 1, wherein the polymeric plasticizer is a non-glutarate plasticizer.

3. The composition of claim 1, wherein the metal oxide or hydroxide is selected from the group consisting of CaO, CaOH, MgO, MgOH, $TiO_2$, $Fe_2O_3$, ZnO, and mixtures thereof.

4. The composition of claim 3, wherein the metal oxide or hydroxide is selected from the group consisting of CaO, CaOH, MgO, MgOH, and mixtures thereof.

5. The composition of claim 4, wherein the metal oxide or hydroxide is selected from the group consisting of CaO, CaOH, and mixtures thereof.

6. The composition of claim 5, wherein the metal oxide is CaO.

7. The composition of claim 1, wherein the polymeric plasticizer is selected from the group consisting of polymeric sebacates; polymeric adipates; polymeric phthalates; polymeric phthalate adipates; polymeric adipate phthalates; and mixtures thereof.

8. The composition of claim 7, wherein the polymeric plasticizer is a polyester adipate.

9. The composition of claim 8, wherein the polyester adipate is a polymerized reaction product of adipic acid and a diol terminated with a fatty ($C_8$ to $C_{18}$) alcohol or a fatty ($C_8$ to $C_{18}$) acid.

10. The composition of claim 9, wherein the polyester adipate has a weight average molecular weight in the range of about 1000 to about 5000.

11. The composition of claim 1, wherein the monomeric $C_5$ or less diacid plasticizer dialkyl ether, having the following structural formula:

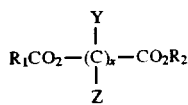

wherein x=1–3; and
when x=1, Y and Z (same or different)=H or $CH_3$
when x=2, Y=H and Z=H or $CH_3$
when x=3, both Y and Z=H, and
wherein $R_1$ and $R_2$ (same or different)=H, an alkyl group having about 8 to about 18 carbon atoms, or a $C_8$-$C_{18}$ alkyl ether group.

12. The composition of claim 11, wherein the monomeric $C_5$ or less diacid plasticizer is a di-long chain (predominantly $C_8$ to $C_{18}$) ether, having the following structural formula:

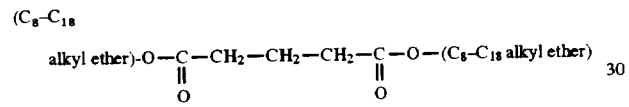

13. A method of manufacturing a plasticized polyvinyl chloride resin comprising admixing with said resin a composition comprising a polymeric polyester plasticizer for said polyvinyl chloride resin; a monomeric $C_5$ or less diacid ester plasticizer, in a weight ratio of polymeric plasticizer to monomeric plasticizer additive of 95/5 to 5/95, said plasticizers included in a total amount of about 20% to about 100% by weight, based on the weight of polyvinyl chloride resin; and a metal salt additive selected from metal oxides and metal hydroxides, wherein the metal has an oxidation state selected from the group consisting of plus two, plus three, and plus four, said metal salt included in the composition in an amount of at least about 0.1%, based on the weight of polyvinyl chloride resin.

14. The method of claim 13, wherein the polymeric plasticizer is a plasticizer that is a non-glutarate plasticizer.

15. The method of claim 13, wherein the metal oxide or hydroxide is selected from the group consisting of CaO, CaOH, MgO, MgOH, $TiO_2$, $Fe_2O_3$, ZnO, and mixtures thereof.

16. The method of claim 15, wherein the metal oxide or hydroxide is selected from the group consisting of CaO, CaOH, MgO, MgOH, and mixtures thereof.

17. The method of claim 16, wherein the metal oxide or hydroxide is selected from the group consisting of CaO, CaOH, and mixtures thereof.

18. The method of claim 17, wherein the metal oxide is CaO.

19. The method of claim 14, wherein the polymeric plasticizer is selected from the group consisting of polymeric sebacates; polymeric adipates; polymeric phthalates; polymeric phthalate adipates; polymeric adipate phthalates; and mixtures thereof.

20. The method of claim 19, wherein the polymeric plasticizer is a polyester adipate.

21. The method of claim 20, wherein the polyester adipate is a polymerized reaction product of adipic acid and a diol terminated with a fatty ($C_6$ to $C_{18}$) alcohol or a fatty ($C_6$ to $C_{18}$) acid.

22. The method of claim 21, wherein the polyester adipate has a weight average molecular weight in the range of about 1,000 to about 5,000.

23. The method of claim 13, wherein the monomeric $C_5$ or less diacid ester plasticizer is selected from the group consisting of formula IA-IL, and mixtures thereof:

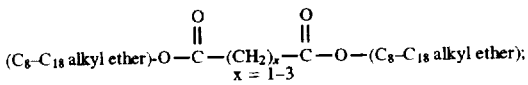

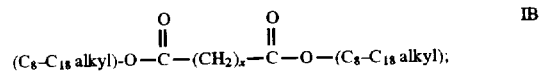

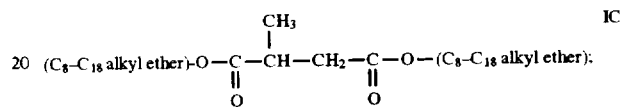

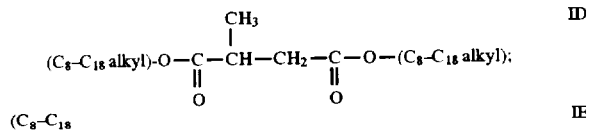

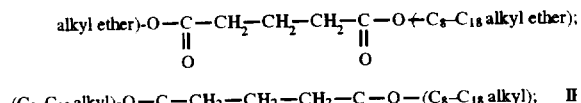

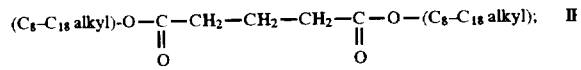

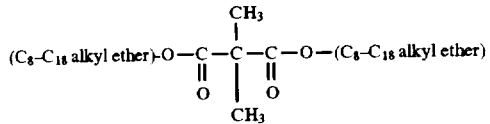

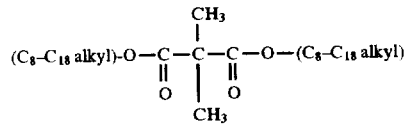

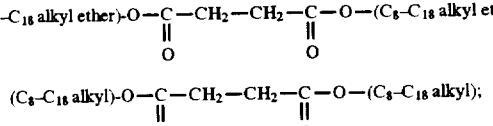

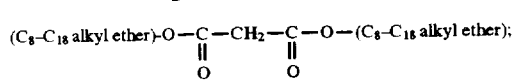

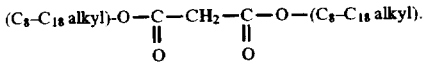

24. The method of claim 23, wherein the $C_5$ or less diacid ester plasticizer is:

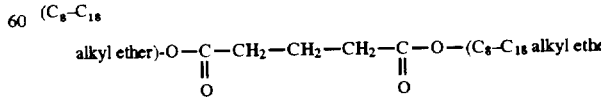

25. A plasticized PVC resin composition having reduced hydrophobicity comprising: a polyvinyl chloride resin; polymeric polyester plasticizer for said polyvinyl chloride resin; a monomeric $C_5$ or less diacid ester plasticizer additive, in a weight ratio of polymeric plasticizer to monomeric plasticizer of 95/5 to 5/95, said plasticizers included in a total amount of about 20% to about 100% by weight, based on the weight of polyvinyl chloride resin; and a metal salt additive selected from metal oxides and metal hydroxides, wherein the metal has an oxidation state selected from the group consisting of plus two, plus three, and plus four, said metal salt included in the composition in an amount of at least about 0.1%, based on the weight of polyvinyl chloride resin.

26. A method of reducing the hydrophobicity of polyvinyl chloride resin comprising admixing with said resin a polymeric polyester plasticizer for said polyvinyl chloride resin; a monomeric $C_5$ or less diacid ester plasticizer, in a weight ratio of monomeric plasticizer to plasticizer of 95/5 to 5/95, said plasticizers included in a total amount of about 20% to about 100% by weight, based on the weight of polyvinyl chloride resin; and a metal salt additive selected from metal oxides and metal hydroxides, wherein the metal has an oxidation state selected from the group consisting of plus two, plus three, and plus four, said metal salt included in the composition in an amount of at least about 0.1%, based on the weight of polyvinyl chloride resin.

27. A method of affixing an aqueous coating composition to a polyvinyl chloride sheet or film formed from polyvinyl chloride resin comprising:

plasticizing said polyvinyl chloride resin by admixing with said resin a polymeric polyester plasticizer for said polyvinyl chloride resin; a monomeric $C_5$ or less diacid ester plasticizer, in a weight ratio of polymeric plasticizer to monomeric plasticizer of 95/5 to 5/95, said plasticizers included in a total amount of about 20% to about 100% by weight, based on the weight of polyvinyl chloride resin; and a metal salt additive selected from metal oxides and metal hydroxides, wherein the metal has an oxidation state selected from the group consisting of plus two, plus three, and plus four, said metal oxide included in the composition in an amount of at least about 0.1%, based on the weight of polyvinyl chloride resin; forming said plasticized resin into a sheet or film; applying a continuous or discontinuous coating of said aqueous coating composition on said sheet or film; and drying said coating.

28. The method of claim 27, wherein the weight ratio of monomeric plasticizer to polymeric plasticizer is in the range of about 10/90 to about 40/60.

* * * * *

UNITED STATES PATENT AND TRADEMARK OFFICE
CERTIFICATE OF CORRECTION

PATENT NO. : 5,777,014
DATED : July 7, 1998
INVENTOR(S) : Hopper et al.

It is certified that error appears in the above-identified patent and that said Letters Patent is hereby corrected as shown below:

Column 14,
Line 43, "PAPAPLEX®" should be -- PARAPLEX® --.

Column 15,
Table 8 in the "Variable" section in column 59, "G-54 90" should be -- G-54 80 --.

Column 18,
Table 8-continued in the "Variable" section in column 57, "G-30 60" should be -- G-30 80 --.

Signed and Sealed this

Sixteenth Day of October, 2001

Attest:

NICHOLAS P. GODICI
Attesting Officer    Acting Director of the United States Patent and Trademark Office